United States Patent
Ellmann et al.

(10) Patent No.: US 7,694,632 B2
(45) Date of Patent: Apr. 13, 2010

(54) MAGNET ARRANGEMENT FOR A MAGNETIC LEVITATION VEHICLE

(75) Inventors: Siegfried Ellmann, Aschheim (DE); Friedrich Loeser, Riemerling (DE)

(73) Assignee: ThyssenKrupp Transrapid GmbH, Kassel (DE)

( * ) Notice: Subject to any disclaimer, the term of this patent is extended or adjusted under 35 U.S.C. 154(b) by 366 days.

(21) Appl. No.: 10/590,378

(22) PCT Filed: Mar. 9, 2005

(86) PCT No.: PCT/DE2005/000408
§ 371 (c)(1), (2), (4) Date: Aug. 23, 2006

(87) PCT Pub. No.: WO2005/090116
PCT Pub. Date: Sep. 29, 2005

(65) Prior Publication Data
US 2007/0169662 A1     Jul. 26, 2007

(30) Foreign Application Priority Data
Mar. 15, 2004 (DE) ........................ 10 2004 012 746

(51) Int. Cl.
    *B60L 13/04* (2006.01)
(52) U.S. Cl. .................. 104/282; 104/281; 104/284
(58) Field of Classification Search ................ 104/281, 104/282, 283, 284, 285, 286
    See application file for complete search history.

(56) References Cited

U.S. PATENT DOCUMENTS

| | | | |
|---|---|---|---|
| 3,797,403 A * | 3/1974 | Schwarzler et al. ......... | 104/284 |
| 4,636,667 A * | 1/1987 | Holzinger et al. ............ | 310/13 |
| 4,698,895 A * | 10/1987 | Miller et al. ................. | 29/464 |
| 5,467,718 A * | 11/1995 | Shibata et al. .............. | 104/284 |
| 5,628,252 A * | 5/1997 | Kuznetsov ................... | 104/284 |
| 6,357,359 B1 * | 3/2002 | Davey et al. ................ | 104/282 |
| 6,450,103 B2 * | 9/2002 | Svensson ..................... | 104/120 |
| 6,568,332 B1 * | 5/2003 | Holzinger et al. ........... | 104/281 |
| 6,601,519 B1 * | 8/2003 | Bindloss et al. ............. | 104/284 |
| 6,827,022 B2 * | 12/2004 | van den Bergh et al. .... | 104/284 |
| 7,380,508 B2 * | 6/2008 | Li ................................ | 104/284 |
| 2001/0001895 A1 * | 5/2001 | Setiabudi et al. ............. | 29/609 |
| 2004/0123766 A1 * | 7/2004 | van den Bergh et al. .... | 104/281 |
| 2006/0096495 A1 * | 5/2006 | Fischperer ................... | 104/281 |
| 2006/0097116 A1 * | 5/2006 | Fischperer ................... | 246/468 |
| 2006/0130699 A1 * | 6/2006 | Thornton et al. ............ | 104/284 |
| 2006/0219128 A1 * | 10/2006 | Li ................................ | 104/284 |

(Continued)

FOREIGN PATENT DOCUMENTS

DE            34 10 119            10/1985

(Continued)

*Primary Examiner*—S. Joseph Morano
*Assistant Examiner*—Jason C Smith
(74) *Attorney, Agent, or Firm*—Michael J. Striker (57) ABSTRACT

A magnet arrangement (10) for a magnetic levitation vehicle (1) is described. The magnet arrangement comprises at least one magnetic pole (11) consisting of a core (14) and a winding (12) applied to the core, a control circuit connected to the winding (12) and a power supply unit for supplying at least the electrical energy required for the control circuit. According to the invention, the magnet arrangement (10) is designed as an autonomous modular unit integrating within itself the magnetic pole (11), the control circuit and the power supply unit (FIG. 5).

10 Claims, 9 Drawing Sheets

U.S. PATENT DOCUMENTS

| | | | |
|---|---|---|---|
| 2007/0095245 A1* | 5/2007 | Li | 104/284 |
| 2007/0131134 A1* | 6/2007 | Post | 104/284 |
| 2007/0169661 A1* | 7/2007 | Hahn et al. | 104/281 |
| 2007/0169662 A1* | 7/2007 | Ellmann et al. | 104/282 |
| 2008/0257197 A1* | 10/2008 | Hahn et al. | 104/282 |

FOREIGN PATENT DOCUMENTS

| | | |
|---|---|---|
| DE | 39 28 277 | 12/1990 |
| EP | 0 580 107 | 1/1994 |
| WO | 97/30504 | 8/1997 |

\* cited by examiner

MAGNET ARRANGEMENT FOR A MAGNETIC LEVITATION VEHICLE

The invention relates to a magnet arrangement of the species mentioned in the preamble of Claim 1.

Prior art magnet arrangements of this type serve the functions of "carrying" and/or "guiding", and to fulfil this purpose they are equipped with a number of magnet poles. Moreover, they are provided with gap sensors which measure the gaps between the magnet poles and the track for the magnetic levitation vehicle, i.e. for example the distance of magnet poles from the long stator of a long stator linear motor or a lateral guide rail. The measuring signals are transmitted to control circuits which are connected with the windings of the magnet poles and which regulate the electric current through these windings in such a manner that the gaps between the magnet poles and the track substantially remain constant during operation.

Magnet arrangements as described hereunder furthermore contain a power supply unit which supplies the energy required for the board net which feeds electrical energy to the control circuits and the electrical installations installed in the magnetic levitation vehicle, e.g. heaters, lamps, or the like. In prior art magnet arrangements (e.g. DE 34 10 119 A1) the energy supply unit contains additional windings embodied in selected magnet poles for a linear generator. In these windings, voltages that depend on the speed of the magnetic levitation vehicle are induced which are brought to the voltage applied in the on-board net, e.g. 440 V, by the aid of voltage converters, e.g. step-up choppers.

The described components are arranged at various places in a magnetic levitation vehicle. While magnet poles interconnected through so-called pole backs are fastened to rigid magnet back boxes of the magnet arrangements connected to a car body, the gap sensors and windings of the linear generators are directly integrated into the magnet arrangement parts that are provided with the magnet poles. Finally, the remaining components of the control circuit, e.g. the controllers and actuators as well as the choppers of the energy supply unit are accommodated in a room under a passenger compartment of the car body. Accordingly it is possible to combine a support magnet and a guiding magnet to form a compact module.

This structural design demands a substantial expenditure on electrical lines to be laid. The energy generated in the area of the magnet poles and the signals generated by the gap sensors are to be transmitted to the components located in the car body and from there back to the magnet poles. If every magnet arrangement is subdivided for redundancy considerations into two independently operable groups of magnet poles, which is common practice, the expenditure of cabling would be doubled, especially if there are other facilities installed between the actual car body and the magnet arrangements, such as levitating frames, support brackets or the like, which enhance the length of cable runs substantially. In addition, it would be necessary to lay lines that lead to buffer batteries of the on-board net and/or away from these.

Apart from the required expenditure on cables, another disturbing factor in such magnet arrangements is the expenditure on repair and maintenance which is a result of the different places of installation of the described components.

After all it should be considered that the system length of usual magnetic levitation vehicles amounts to 3096 mm, for example, and therefore a plurality of magnet arrangements of the described type, arranged one behind the other, is provided in the longitudinal direction of a magnetic levitation vehicle.

Now, therefore, the technical problem to be solved by the present invention is to configure the magnet arrangement of the species mentioned above in such a manner that the expenditure on cabling and on performing repair and maintenance work is remarkably reduced.

The characterizing features of Claim 1 serve for solving this problem.

The invention bears the advantage that all components required for control and energy supply are integrated parts of the associated magnet arrangement. Each magnet arrangement thereby forms a mechatronic autonomous module. In the sense of this invention, this means that the magnet arrangement combines all components in itself which are needed to lead to the desired function, e.g. a status of levitation. For this purpose it is particularly advantageous to accommodate the control circuits and energy supply units for the magnet arrangements in the magnet back and, thereby, in immediate vicinity to the magnet poles. As the magnet back is expediently configured as a hollow body for reasons of stiffness, it readily offers sufficient space for all electrical components. This yields substantial savings in space of installation and cabling as well as in weight and cost. Moreover, it facilitates repair and maintenance work, because the magnet back is easily accessible from outside and can be provided with an external, easily detachable covering, giving rapid access upon its removal to components that have been mounted by the aid of drawer units or the like in the magnet pole.

Other advantageous features of the present invention become evident from the sub-claims.

The invention is explained in greater detail hereinbelow by means of a preferred embodiment and based on the drawings enclosed hereto which have been prepared in different scales, wherein.

Figure 1:
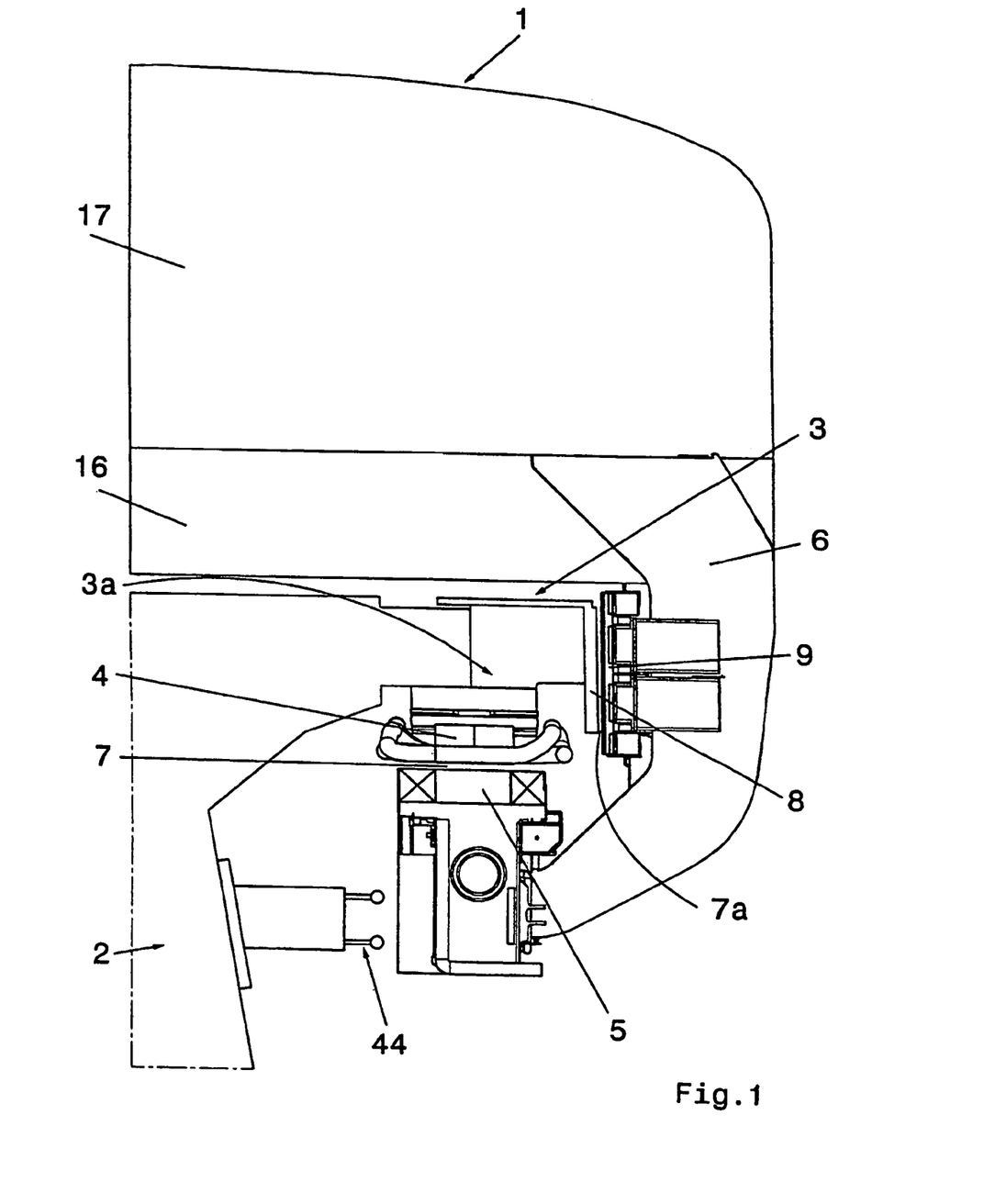
FIG. 1 schematically shows a partial section through a usual magnetic levitation vehicle in the area of a track provided with a long stator.

FIG. 1 schematically shows a cross-section through a magnetic levitation vehicle 1 which is conventionally movably mounted on a guideway extending in longitudinal direction of a route, said guideway being comprised of beams (supports) 2 made of steel and/or concrete as well as guideway plates 3 mounted on it. The propulsion of the magnetic levitation vehicle 1 is effected by a long stator motor which is comprised of stator packets 4 affixed underneath the guideway plates 3 and arranged one behind the other in their longitudinal direction. The stator packets 4 are comprised of alternatively succeeding teeth and grooves not shown here, with windings being inserted therein that are fed with three-phase current of a variable amplitude and frequency. The actual excitation field of the long stator motor is generated by at least one first magnet arrangement acting as support magnet 5 which is affixed by at least one lateral support bracket 6 to said magnetic levitation vehicle 1 and which is comprised of magnet poles facing the downwardly open grooves of the stator packets 4 as shown in FIG. 1. The support magnet 5 not only provides the excitation field, but also fulfils the function of carrying and levitation by maintaining a defined air gap 7 of e.g. 10 mm between said support magnet 5 and said stator packets 4 during operation of the magnetic levitation vehicle 1.

For the guidance of the magnetic levitation vehicle 1 the guideway plates 3 comprise laterally affixed guidance rails 8, which are faced by guidance magnets 9 also mounted to the support brackets 6 and serving for maintaining a gap 7a corresponding to gap 7 between itself and the guidance rail 8 during operation of the vehicle.

Figure 2:
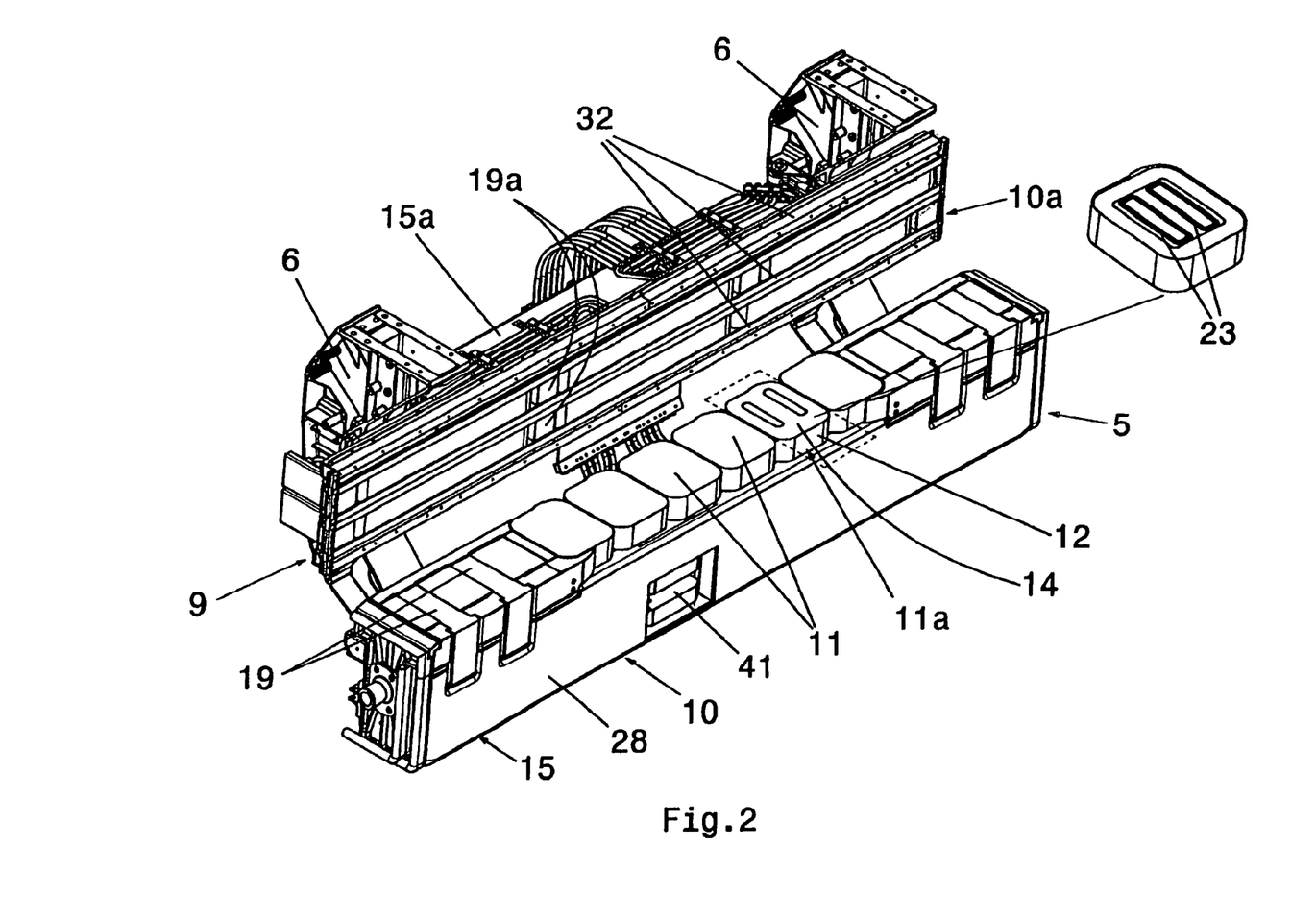
FIGS. 2 and 3 show a perspective view of a module with two magnet arrangements of a magnetic levitation vehicle pursuant to FIG. 1, viewed from the track side and from the outside, respectively.
Figure 3:
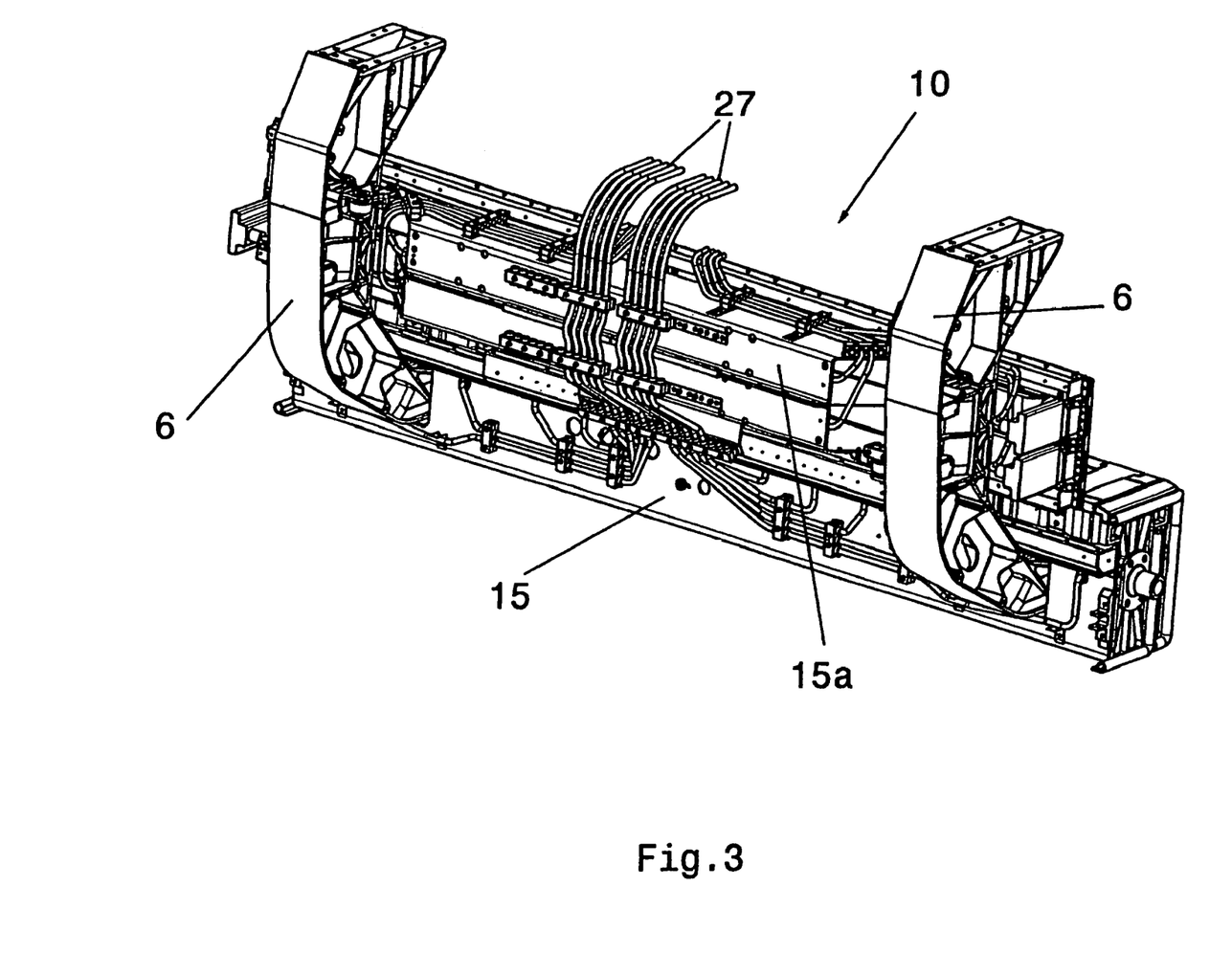

As shown on FIGS. 2 and 3, the support magnet 5 and the guidance magnet 9 shown in FIG. 1 form a module being affixed to the support brackets 6 and comprising a magnet arrangement 10, 10a for the functions of "supporting" (carrying) and "guiding". However, it is obvious that a plurality of such modules can be mounted at the magnetic levitation vehicle 1 in lateral arrangement side by side and one behind the other, viewed in the direction of travel.

The magnet arrangement 10 for the "carrying" function is comprised of twelve magnet poles 11 arranged one behind the other, whose windings 12 and cores 14, being schematically indicated in FIG. 2 for one of said magnet poles 11a, are electrically connected in series and are usually surrounded by a corrosion protection in form of a cast resin layer or the like. Said cores 14 of the individual magnet poles 11 are connected to each other by pole backs not shown and affixed by pole plates and rods penetrating through these pole plates, also not shown, to a means hereinafter called magnet back box 15 of the magnet arrangement 10. Engaging to this magnet back box 15 via primary springs are the support brackets 6 which are connected with a bend-proof understructure or suspension frame 16 (FIG. 1) being comprised of longitudinal and transverse connectors and supporting a car body 17 of said magnetic levitation vehicle 1 equipped with a passenger cell.

Magnetic levitation vehicles 1 and their magnet arrangements are generally known to an expert, e.g. through printed publications U.S. Pat. No. 4,698,895, DE 39 28 277 A1, and PCT WO 97/30504 A1, which for sake of simplicity are made a part of the present disclosure by reference.

Figure 4:
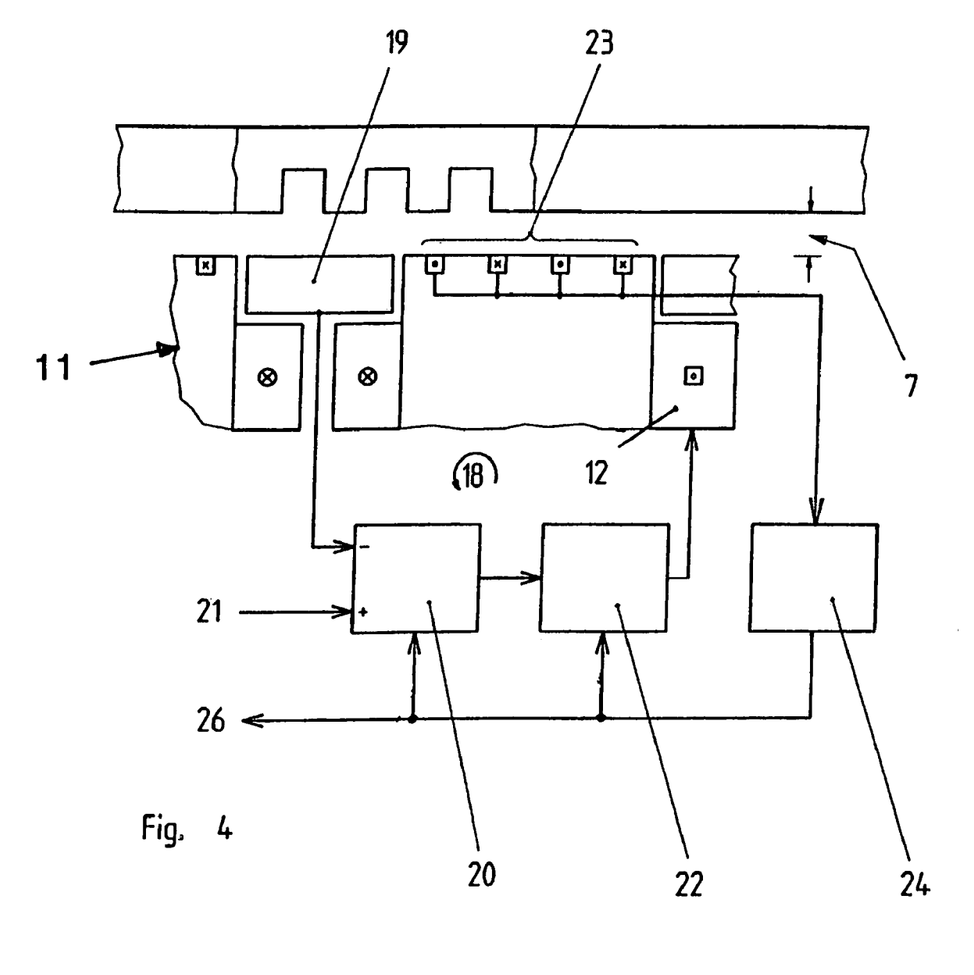
FIG. 4 schematically shows a control loop for the magnet arrangements according to FIG. 2 and FIG. 3.

One control circuit 18 according to FIG. 4 serves for controlling the windings 12 of the magnet poles 11 to maintain the gap 7 constant during the ride of the magnetic levitation vehicle 1. This control circuit comprises at least one gap sensor, or preferably several gap sensors 19 (see also FIG. 2,) which border the same plane as the magnet poles 11, which measure the actual size of the gap 7 by inductive or capacitive means and which serve as actual value transmitters for the control circuit 18. The electrical signals transmitted by gap sensors 19 are passed to a controller 20 and compared there with a nominal value fed by a line 21 and being fixedly preselected or adapted. Thereof, the controller 20 determines a differential or actuator signal for an actuator 22 which in turn controls the current through the windings 12 in such a manner that the gap 7 substantially takes a constant size and maintains it during the ride.

The required operating voltage for the control circuit 18 is supplied by a power supply unit shown in FIG. 4 and including windings 23 of a linear generator, said windings being mounted in at least one magnet pole, shown as an example in FIG. 2 in an enlarged detail of magnet pole 11a, and supplying in co-action with the long stator an alternate voltage of e.g. up to 300 V, depending on the speed of the magnetic levitation vehicle 1. This voltage is transformed in a voltage converter 24, having e.g. a step-up chopper, to a direct voltage of e.g. 440 V envisaged for operation, said voltage being fed to the controller 20 and the actuator 22 on the one hand and passed on through a line 26 to the on-board net of the magnetic levitation vehicle on the other hand.

While the controller 20, actuator 22 and the voltage transformer 24 have hitherto been placed anywhere, preferably in the floor of car body 17, thus calling for extensive cable routing as indicated by reference number 27 in FIG. 3, the present invention proposes to house these components entirely in the magnet back box 15 of the magnet arrangement 10. This results especially from FIG. 5, which shows a view of the magnet back box 15 upon removal of a covering 28 pointing to the track 2 (FIG. 2). Reference numerals 29 by example show openings in the magnet back box 15 which serve for accommodating drawer-like units 30 not illustrated in greater detail but indicated in FIG. 6 and FIG. 7 and housing the control circuit 18 and its components 20 and 22 as well as the voltage converters 24 of the power supply unit. Expediently the drawer-like units 30 are so configured that the correct contacts can be established when assembled without this requiring any further additional work, i.e. the openings 29 and the drawer-like units 30 are provided with co-acting plug-in and draw-out means or the like.

Accommodation of the control circuit 18 and the voltage converter 24 in the magnet back box 15 is possible without any problem, because the magnet back box 15 in known magnet arrangements 10 substantially consists of a hollow body with a U-profile, thus offering sufficient space. Thereby one can largely dispense with the cabling 27, because actually only the line 26 leading to the on-board net as well as any required lines for control and diagnostic purposes must be laid outside from the magnet back box 15. All the other lines can be laid within the magnet back box 15 and be laid from there on the shortest distance to the gap sensors 19 as well to as the windings 12 and 23. It follows therefrom that the entire magnet arrangement 10 including the magnet poles 11, the control circuit 18, the power supply unit 23, 24, and the cabling form an autonomous mechatronic module in which all the functions needed for the ability of levitation are integrated. If required, additional buffer batteries can be accommodated in the magnet back box 15 which in case of a standstill or a too slow ride of the magnetic levitation vehicle 1 supply the required energy.

Apart from the magnet arrangement 10 for the function of "carrying", the module shown in FIG. 2 has another magnet arrangement 10a with the magnet poles 32 for the function of "guiding". The magnet arrangement 10a is provided near a magnet back box 15a (FIG. 3) and expediently accommodated within the same raster length of e.g. 3096 mm which is also applicable to the magnet arrangement 10. By analogy to the gap sensors 19, other gap sensors 19a are assigned to the magnet poles 32 and connected to other control circuits not shown configured like the control circuits 18 and serving the purpose of keeping the gap 7a between magnet poles 32 and the lateral guidance rail 8 (FIG. 1) at a constant value. The same applies to the other control circuits, as has been described by way of the control circuits 18 hereinabove. The power to these control circuits is expediently supplied by the aid of the power supply units 23 and 24, because the guidance magnets normally have no windings of linear generators. In contrast with the magnet arrangement 10, there are only three magnet poles 32 existing in the magnet arrangement 10a which are formed by two rows of three windings each.

The magnet arrangement 10 destined for the function of "carrying" is comprised of twelve magnet poles 11 which are combined to form two groups of six magnet poles each lying immediately side by side. Each of these groups is controlled by one control circuit 18 each and expediently supplied with electric current by a power supply unit 23, 24 individually assigned to one group each. The advantage thus achieved on the one hand is that in case of a failure of one group, the other group keeps on working. On the other hand, in case of a failure of one group, the pertinent suspension frame 16 with its bend-proof longitudinal and transverse connectors is kept in its position by means of an assigned group of an adjacent magnet arrangement, without causing the magnetic levitation vehicle 1 to land on a gliding rail or without causing the magnet arrangement 10 to hit against the long stator. However, it also entails the two disadvantages outlined below.

A first disadvantage of a group-wise combination of six magnet poles 11 each is that comparably high voltages may occur in their windings 12. These are primarily caused by capacitive voltage excesses which result from the production of the windings of the magnet poles 11 from line bands and the parasitic capacities thus generated. The electrical oscillation circuits formed by the inductivities of the windings and the parasitic capacities lead to resonance oscillations which when the magnet arrangement 10 is excited, might entail so high voltages and electric currents that damage to isolation will occur. Another disadvantage is that the control circuits 18 have to be provided with special safety means which in case of a faulty working of an actuator 22 (FIG. 4) prevent the assigned group of magnet poles 11 from hitting against the long stator 11.

Figures 6, 7:
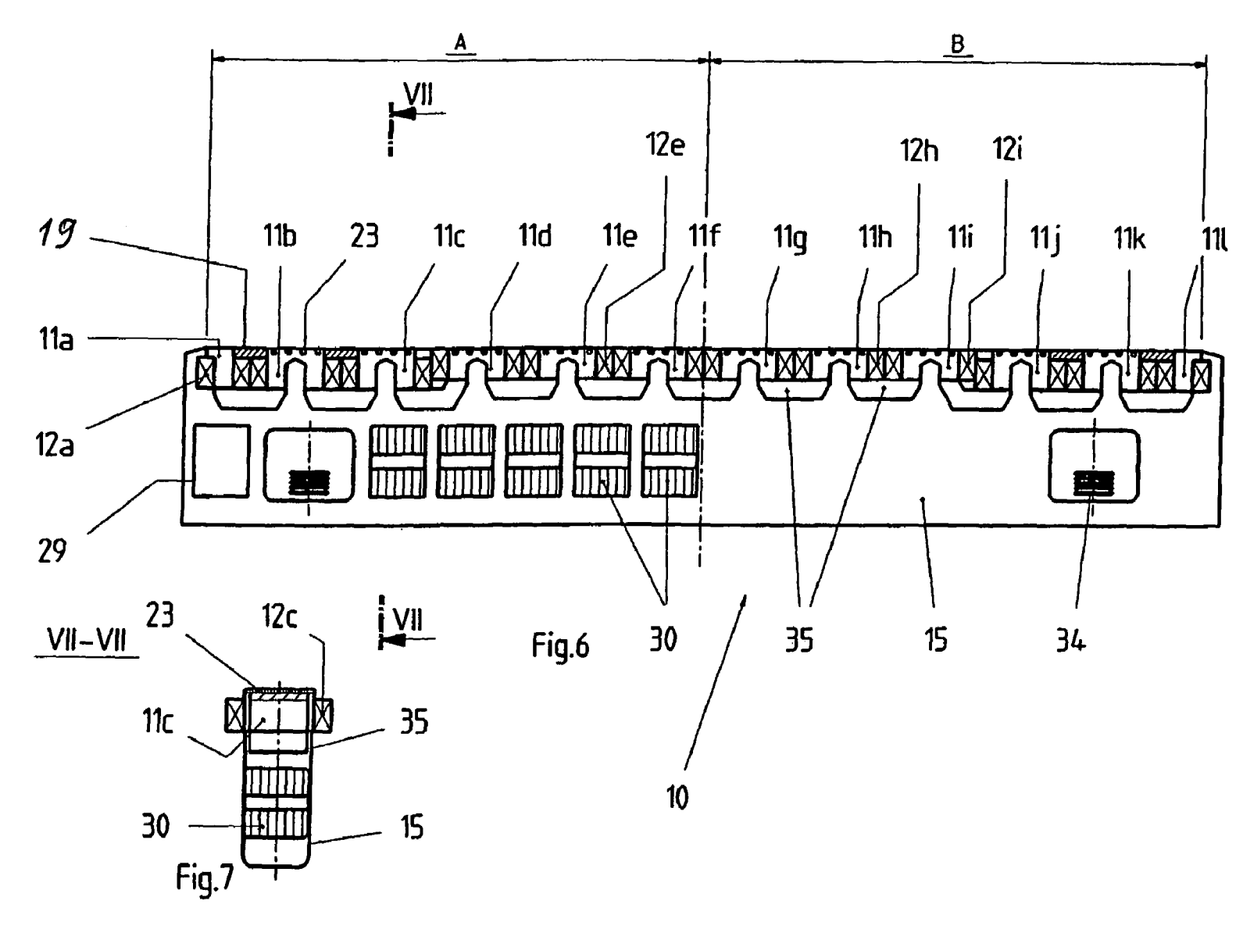
FIG. 6 shows a schematic front view of one of the magnet arrangements of FIG. 5 with further details.
FIG. 7 shows a section along line VII-VII of FIG. 6.
Figure 8:
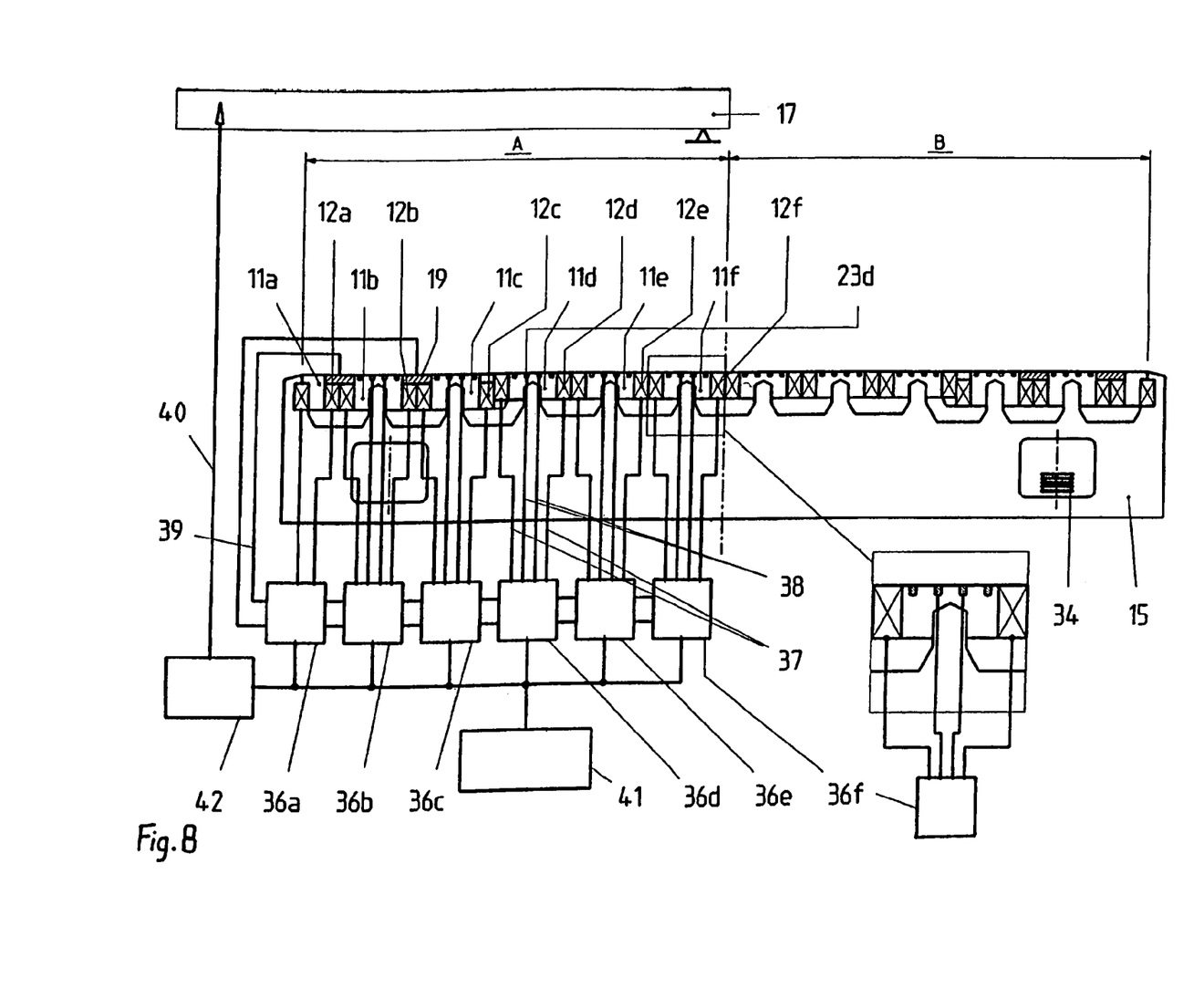
FIG. 8 shows a schematic circuit diagram for the magnet arrangement of FIG. 6 with the inventive individual activation of its magnet poles.

To avoid these disadvantages this invention proposes to provide each group only with one magnet pole 11 or maximally two magnet poles 11. Such an allocation of magnet poles 11 is shown on FIG. 6 to FIG. 8. The magnet arrangement 10 here contains twelve magnet poles 11a to 11l with windings 12a etc., only partly represented gap sensors 19 as well as windings 23 of the linear generator. Moreover, the magnet back box 15 and the drawer-like units 30, which contain the control circuits 18 and the power supply units, are indicated as in FIG. 2. The components contained in the drawer-like units 30 are shown in FIG. 8, however underneath the magnet back box 15 for the sake of a better understanding. Reference numerals 34 indicate recesses into which the ends of the support brackets 6 according to FIG. 1 and FIG. 2 enter. Furthermore, FIG. 6 shows the pole backs 35 not visible on FIG. 2, which connect the cores 14 of magnet poles 11 with each other. Finally, FIGS. 6 and 8 show that six magnet poles 11a to 11f or 11g to 11l each form one half-magnet A and B which are mechanically coupled in a known manner to the suspension frame 16 for the car body 17 (FIG. 1) of the magnetic levitation vehicle 1.

As shown in FIG. 8, the magnet poles 11 are electrically controlled individually and independently of each other. For this purpose, one of the magnet pole units 36a to 36f is assigned to each magnet pole 11a to 11f in the half-magnet A, each magnet pole unit containing an assigned control circuit 18 and an assigned voltage converter 24 provided with a step-up chopper or the like of the type as described above. Furthermore, each magnet pole winding 12 (e.g. especially a winding 12d of magnet pole 11d) is connected through lines 37 with an associated magnet unit (e.g. especially the magnet pole unit 36d) and the control circuit 18 contained therein and each linear generator winding 23 (e.g. especially a winding 23d of magnet pole 11d) is connected through lines 38 with the associated magnet pole unit 36d and the voltage converter 24 of FIG. 4 contained therein. The same applies in a same sense to all the other magnet poles 11, as is particularly shown by the enlarged representation of magnet pole 11f in FIG. 8. Moreover, the existing gap sensors 19 are connected via lines 39 with all magnet pole units 36 in order to transmit the relevant actual values of gap 7 to the control circuits 18 thereof. The other half-magnet B is configured accordingly.

On account of the described arrangement, each half-magnet A, B contains six magnet poles 11 with one assigned magnet pole unit 36 each. Therefore, if a magnet pole 11 or the pertinent magnet pole unit 36 becomes defective, there is no danger of an entire failure of the magnet pole arrangement 10 or of a half-magnet A, B, because the adjacent magnet poles of the defective unit can readily take-over their function. Therefore it is not required to provide the control circuits 18 with special security facilities against faulty controls of actuators 22, and there will be no occurrence of detrimental capacitive voltage excesses. Corresponding advantages will be obtained, if the magnet poles 11 are not activated individually, but in pairs. It is of special advantage that in case of a failure of any component, only one or maximally two magnet poles 11 will fail to work rather than six or twelve magnet poles 11 of a half-magnet or the entire magnet arrangement 10. Moreover, the voltage level is decreased, thus making it possible to reduce the voltage envisaged for the board net.

Besides, FIG. 8 also shows a special feature with regard to the magnet poles 11a and 11l, which form the beginning or the end of the magnet arrangement 10. As these magnet poles 11a, 11l are configured as half poles, thus leaving no space for the attachment of a linear generator winding 23, the pertinent magnet pole units 36a and 36l are expediently supplied with electrical current from the on-board net, as indicatively shown on FIG. 8 by a line 40.

The procedure to follow for the control of the magnet poles 32 of the guidance magnet is similar.

Generating on-board energy by the aid of linear generators works only in those track sections where the speed of the magnetic levitation vehicle 1 achieves a certain minimum rate. In other track sections, the electrical energy is therefore generated by the aid of electric contact rails mounted at the track and to which mechanical or mechanical-pneumatic current collectors 41 (FIG. 8) are assigned to. The current collectors 41 constitute integral parts of the power supply unit in addition to the windings 23 and are connected according to FIG. 8 to each individual magnet pole unit 36 if a single pole control is made. Moreover, the output of the current collector 41 leads through a suitable voltage converter 42, e.g. one that contains a step-up chopper, to the line 40. As shown on FIG. 2 and FIG. 5, the current collector 41 is integrated for example in the magnet back box 15 aerodynamically covered by the covering 28 and thus integrated into the autonomous module of the magnet pole arrangement 10 like the windings 23 of the linear generator.

Since contact rails and mechanical current collectors 41 are not always desired because of their propensity to wear and tear, particularly at high speeds, another essential feature of the invention provides for effecting the transmission of energy from the track 3 to the magnetic levitation vehicle 1 in a different manner, i.e. contact-less and preferably inductively. This is particularly shown in FIG. 9 which represents a schematic section substantially corresponding to FIG. 1, but at an enlarged scale.

Figure 9:
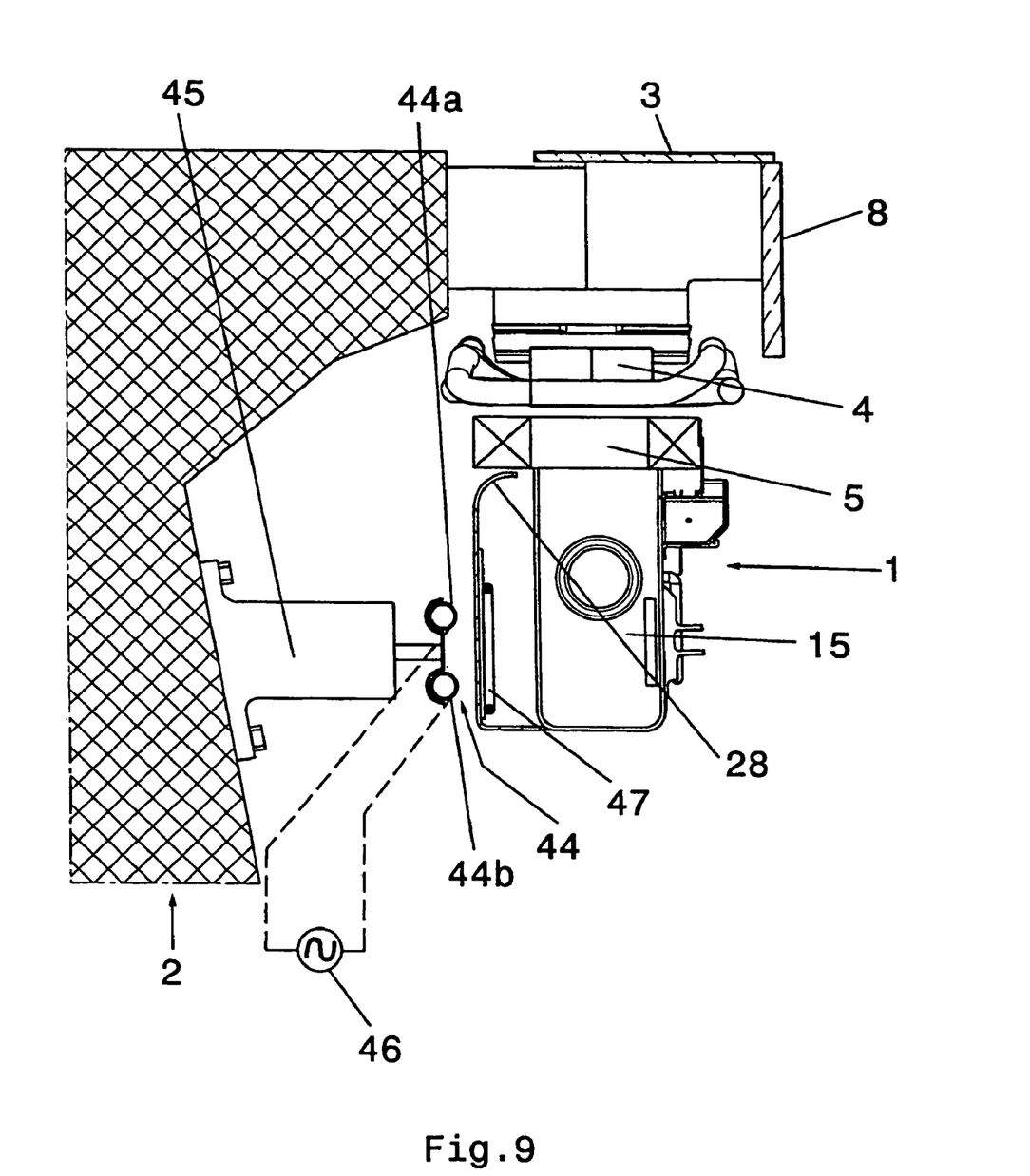
FIG. 9 shows a partial section similar to FIG. 1, but at a larger scale for illustrating a contact-less power transmission from the track to the magnetic levitation vehicle.
Figures 10, 11, 12, 13:
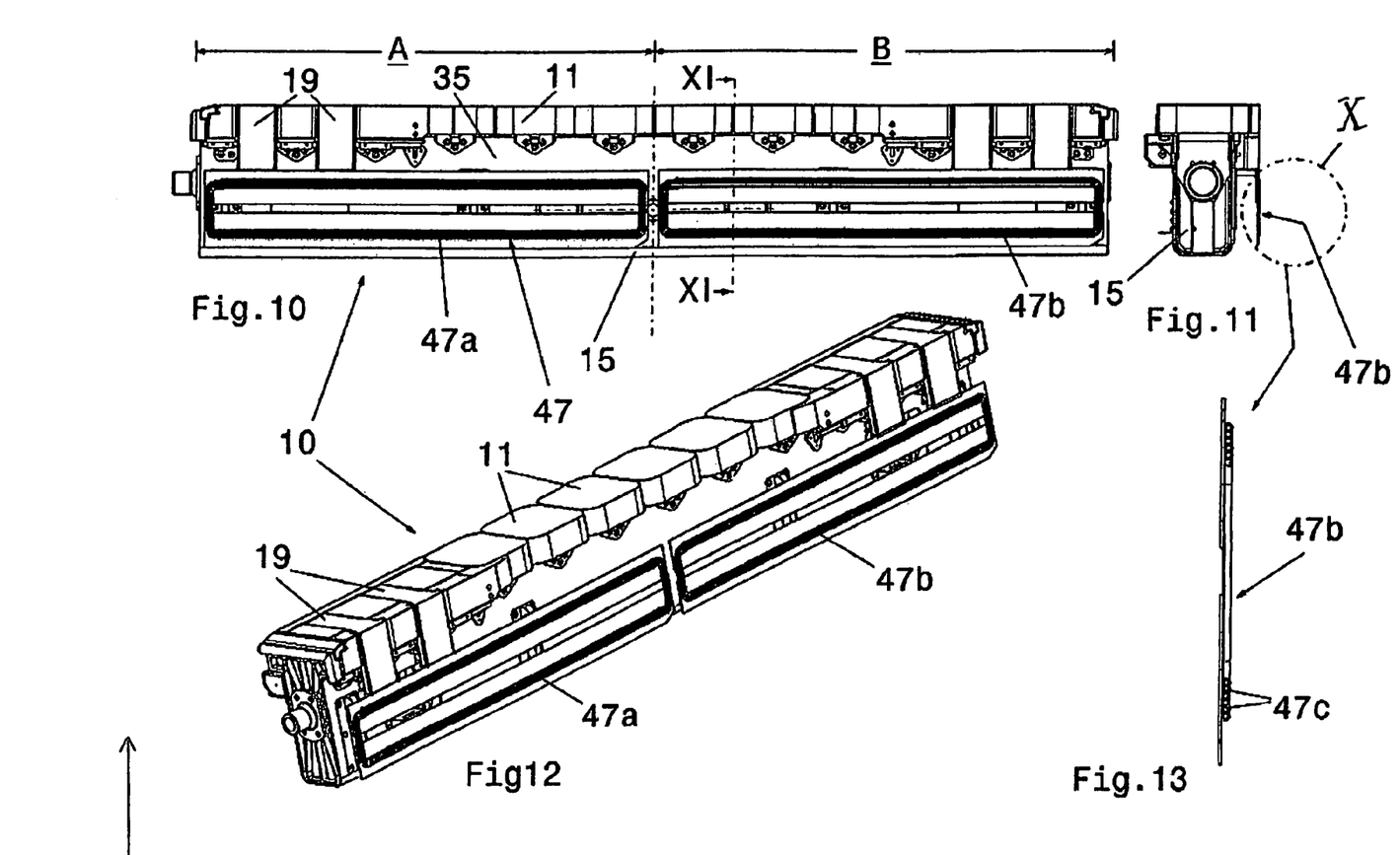
FIG. 10 shows the front view of a magnet arrangement with a pick-up coil for the contact-less power transmission, viewed from the side of a beam of the track.
FIG. 11 shows a section along line XI-XI of FIG. 10.
FIG. 12 shows a perspective front view of the magnet arrangement according to FIG. 10.
FIG. 13 shows an enlarged detail X of FIG. 11.

According to FIG. 9, at a point of the track where hitherto the current rail for the power collector 41 (FIG. 8) has been arranged, a primary conductor 44 configured as a transmitting coil is provided which preferably contains line sections 44a, 44b running to and fro and expediently extending over the entire length of the track 2, 3. The two line sections 44a, 44b are fastened to beam 2, e.g. by means of a holder 45 comprised of an isolator. The primary conductor 44 moreover is connected to at a preferably high-frequency voltage source 46 of 300 V, for example, which is only shown schematically.

Instead of the current collector 41, a receiver or pick-up coil 47 is mounted at the magnetic levitation vehicle 1. It is preferably so configured that it does not surround the primary conductor 44, but stands opposite to it at a small distance. Thus it is possible to house the pick-up coil 47 like the other described components of the control circuits 18 and the power supply units inventively in the magnet back box 15 and to cover it with the covering 18 comprised of an electrically isolating material.

According to a particularly preferred embodiment, the holder 45 is of such a hinged configuration that the primary conductor 44 is hingedly mounted and can be swivelled to the top or to the bottom at beam 2 and can be swung-off sectionwise. It can be avoided, therefore, that the primary conductor 44 must be fully dismounted during a work to which it poses an obstacle.

Figure 5:
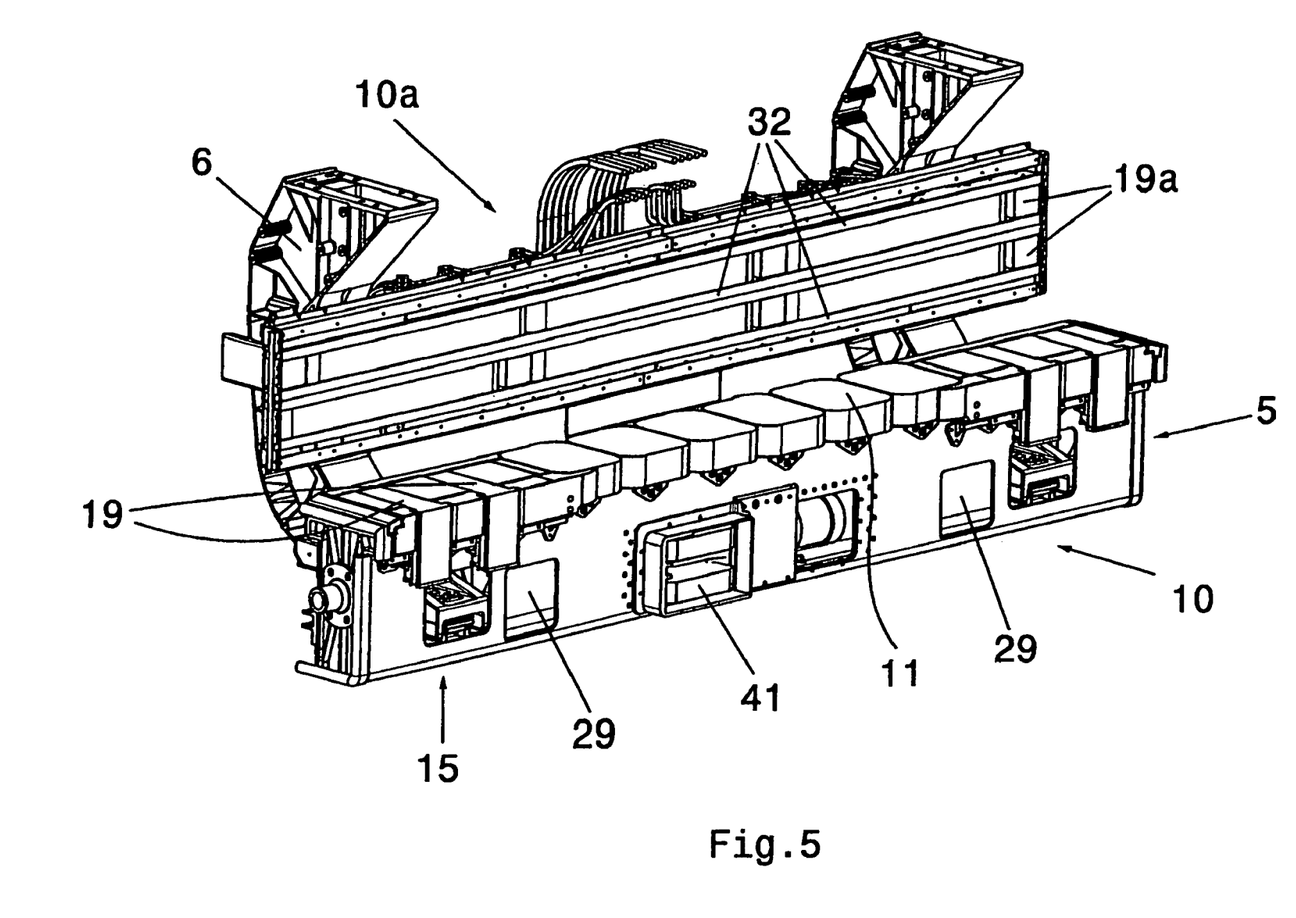
FIG. 5 shows a representation of the module corresponding to FIG. 3, but after removal of a front covering and with a view onto various components mounted in a magnet back box.

The configuration of the receiver coil 47 in shown in FIG. 10 to FIG. 13 in a representation similar to FIG. 5, and for reasons of redundancy the coil 47 expediently has two halves 47a and 47b that are assigned to one of the above described half-magnets A, B each and therefore have a length of approximately 1500 mm each in the embodiment. Each half 47a, 47b illustrated by a thick line in FIG. 10 and FIG. 12 preferably consists of a plurality of parallel conductors 47c (FIG. 13) that are relatively arranged to the primary conductor 44 so as to be penetrated by the concentric magnetic field lines generated by conductor 44 or line sections 44a, 44b respectively and so that the voltage of approximately 300 V supplied by the primary conductor 44 can be coupled out at its connection ends not shown. The two connection ends therefore can be connected to the magnet pole units 36 or voltage converter 42 analogously to FIG. 8. It is obvious that expediently appropriate primary conductors 44 are laid at both sides of the beam 2, if the magnetic levitation vehicle is provided with magnet arrangements 10, 10a at both longitudinal sides.

The receiver coil 47 is preferably manufactured as a pre-fabricated modular group together with the necessary contact elements, e.g. plug connectors, and so mounted at and/or integrated into the magnet back box 15 or covering 28 that it forms part of the autonomous module formed by the magnet arrangement 10.

An essential advantage of a contact-less transmission of power is that it works with mechanically poor wear and that the energy coupled out is independent of the travel speed as in case of applying a contact rail. Moreover, a multiple redundancy is obtained, because there are two coil halves 47a, 47b per magnet arrangement 10. Furthermore, the windings 23 of the linear generator and, if properly rated, even the step-up choppers and on-board batteries can be dispensed with. An emergency power supply, if required, could then be assured by simple lead batteries arranged on the track side.

The invention is not limited to the embodiments described hereinabove that can be modified in a plurality of ways. In particular, this applies to the total number of magnet arrangements 10, 10a existing per magnetic levitation vehicle and to the setup of modules from magnet arrangements 10, 10a for the design of support magnets, guidance magnets or combinations of support and guidance magnets. Furthermore, the number of magnet poles 11, 32 per support and guidance magnet can be chosen in a manner different from the one described. Finally, it is self-explanatory that the different features can also be applied in combinations other than those described and shown hereinabove.

The invention claimed is:

1. A magnet arrangement for a magnetic levitation vehicle (1) comprising:
    at least one magnetic pole (11) consisting of a core (14) and a winding (12);
    a control circuit (18) connected to the winding (12); and
    a power supply unit including a voltage converter (24), for supplying at least the electrical energy required for the control circuit (18);
    wherein the magnet arrangement is constructed as an autonomous modular unit in a form of a hollow-bodied magnet back box (15, 15a), within which is integrated the at least one magnetic pole (11), the control circuit (18) and the power supply unit (23, 24; 24, 41; 24, 47); and
    wherein the magnet back box (15, 15a) includes drawer-like units (30) into which at least the control circuit (18) and the voltage converter (24) of the power supply unit are disposed and, which is configured to be fastened to a car body (17) of said magnetic levitation vehicle (1).

2. A magnet arrangement according to claim 1, characterized in that the magnet arrangement is constructed of a plurality of magnet poles (11), whose windings (12) are electrically connected in series and connected with the control circuit (18).

3. A magnet arrangement according to claim 2, characterized in that the magnet poles (11) are combined to form at least two groups of magnet poles each group being connected to an associated control circuit (18), and that both control circuits (18) are integral parts of the modular unit.

4. A magnet arrangement according to claim 3, characterized in that the magnet poles (11) form a group each, individually or in pairs.

5. A magnet arrangement according to claim 1, characterized in that the power supply unit comprises a winding (23) of a linear generator at least in one magnet pole (11a), which linear generator winding (23) is connected to a voltage converter (24) of the rower supply unit accommodated in the modular unit.

6. A magnet arrangement according to claim 1, characterized in that the power supply unit comprises at least one pick-up coil (47) for a contact-less inductive transmission of energy.

7. A magnet arrangement according to claim 1, characterized in that the power supply unit comprises of least one current collector (41).

8. A magnet arrangement according to claim 1, characterized in that the magnet arrangement is constructed as a support magnet (5) and/or a guidance magnet (9).

9. A magnet arrangement according to claim 8, characterized in that the magnet arrangement is constructed as a module comprising the support magnet (5) and the guidance magnet (9).

10. A magnet arrangement according to claim 1, characterized in that the power supply unit comprises at least one buffer battery integrated in the modular unit.

* * * * *